United States Patent Office 3,386,937
Patented June 4, 1968

3,386,937
NON-EXUDING RUBBERS
Lyle O. Amberg, Landenberg, Pa., assignor to Hercules Incorporated, Wilmington, Del., a corporation of Delaware
No Drawing. Continuation-in-part of abandoned application Ser. No. 416,609, Dec. 7, 1964. This application Jan. 23, 1967, Ser. No. 610,736
12 Claims. (Cl. 260—27)

ABSTRACT OF THE DISCLOSURE

Vulcanizates prepared from high-rosin rubber compositions have not proved entirely satisfactory because the rosin has a tendency to exude from the vulcanizate upon aging. A material such as triethanolamine, n-octylamine, diethanolamine, morpholine, diphenylguanidine, hexamethylenetetramine, a rosin amine and mixtures thereof is added to high-rosin rubber compositions prior to vulcanization to eliminate this tendency of rosin to exude.

---

This application is a continuation-in-part of application Ser. No. 416,609, filed Dec. 7, 1964, now abandoned.

This invention relates to the rubber art, both natural rubber and synthetic rubber. Particularly, this invention relates to novel vulcanizable rubber compositions extended with rosin and the like rubber extenders and to vulcanizates prepared therefrom.

Recently, rosin, both modified and unmodified, has been employed as an extender for rubber such as the commercially available synthetic rubber SBR derived by the copolymerization of styrene and butadiene. Rosin-extended rubber, also referred to as high-rosin rubber, has improved tensile strength and improved resistance to abrasion.

High-rosin rubber will contain, by weight, from about 20 to 100 parts of rosin for each 100 parts of rubber. Vulcanizates prepared from high-rosin rubber compositions have not proved entirely satisfactory because the rosin has a tendency to exude from the vulcanizate upon aging. Thus, for example, disproportionated rosin has exuded from a vulcanizate prepared from a rubber composition comprised of, by weight, 20 parts of disproportionated rosin for each 100 parts of rubber. This exudation, also referred to in the art as "blooming," of rosin affects adversely the appearance, tack, and other properties normally desired in a vulcanizate.

In accordance with this invention, it has been determined that this tendency of rosin to exude from high-rosin rubber vulcanizates can be eliminated substantially by incorporating in the high-rosin rubber composition, prior to vulcanization, a relatively small amount of an amine selected from the group consisting of triethanolamine, n-octylamine, diethanolamine, morpholine, diphenylguanidine, hexamethylenetetramine, a rosin amine, and mixtures of two or more. Suitable rosin amines, and their method of preparation, are disclosed and escribed in U.S. Patent No. 2,491,913, reference to which is hereby made. Suitable rosin amines include N wood rosin amine, hydroabietylamine, and dehydroabietylamine. The rosin amines can be prepared from wood rosin, gum rosin, or tall oil rosin, modified or unmodified, or the pure acids contained therein such as abietic acid and pimaric acid or mixtures of the pure acids. Rosin amines can be prepared also from polymerized rosin. The amine additive is sometimes referred to hereinafter as an "anti-blooming" agent.

The base composition of this invention will be comprised of (A) a rubber component such as natural rubber, a synthetic rubber, mixtures of natural rubber and synthetic rubber, and mixtures of two or more synthetic rubbers, (B) an extender for the rubber component selected from the group consisting of a rosin extender, a substantially petroleum hydrocarbon-insoluble pine wood resin, and mixtures of two or more, and (C) an anti-blooming agent as above defined.

The amount of extender employed will be in an amount of from about 20 parts to 100 parts by weight for each 100 parts by weight of rubber component employed.

The amount of amine additive or anti-blooming agent employed will depend on the nature of the amine itself and on the amount of extender employed. The minimum amount will be that required to prevent exudation of the extender employed. The maximum amount that can be employed will be limited by the effect the amine additive has on the softening of the rubber and the activating effect of the amine which, if used in too large an amount, will lead to pre-curing or scorching of the composition. The optimum amount will usually be that required just to overcome the cure-inhibiting effect of the extender employed, which amount will be usually slightly greater than the minimum amount needed to prevent blooming. For example, the amount of triethanolamine required to prevent exudation of disproportionated rosin from a vulcanizate prepared from a rubber composition comprised thereof will be about 5% by weight, based on the weight of the disproportionated rosin.

When diethanolamine, triethanolamine, n-octylamine, morpholine, and phenylguanidine are employed as anti-blooming agents, the amount employed will usually be within the range of from about 2% to 15% by weight, based on the weight of the extender employed. The amount of hexamethylenetetramine will be in excess of 2% and preferably from about 3% to 15% by weight based on the weight of the extender. When a rosin amine is employed as an anti-blooming agent, the amount employed will be from about 3% to 25% by weight, based on the weight of the extender employed. It is within the skill of those versed in the art, having before them the teachings of this invention, to determine the optimum amount of anti-blooming agent.

The extender can be incorporated into the rubber in any suitable manner and by any suitable means. It can be added on a rubber mill either prior to or together with other compounding ingredients. The anti-blooming agent can be incorporated into the rubber in a manner similar to that employed for incorporating the extender. If desired, the anti-blooming agent and the extender can first be thoroughly admixed and blended together and the resulting blend admixed and thoroughly blended with the rubber as by milling and the like. The anti-blooming agent and/or the extender can be incorporated into the rubber by addition thereof to the polymerization reaction vessel during manufacture of a synthetic rubber.

Rosin extenders employed in this invention include the known rosin extenders for rubber. Suitable rosin extenders include natural rosin, refined or unrefined (refined rosin will usually contain, by weight, about 90% of rosin acids and about 10% of inert material), such as natural wood rosin, natural gum rosin, and tall oil rosin; and modified rosin, refined or unrefined, such as disproportionated rosin, hydrogenated rosin, and polymerized rosin. The pure or substantially pure acids of which rosin is comprised can be used as extenders for rubber and are considered, for the purpose of this invention, to be included in the expression "rosin extenders" as this term is employed in the specification and claims. The pure acids, alone or in admixture, can be used as extenders for rubber. As is well known in the art, the acids of which rosin is comprised include abietic acid, sapinic acid, and d-pimaric acid, and these acids, as well as the other acids found in rosin, are referred to in the art as "rosin acids" or "resin acids." The modified forms of these pure acids or pure acid mixtures can be employed as extenders for rubber. Such modified forms include disproportionated rosin acids such as disproportionated abietic acid, polymerized rosin acids such as dimerized abietic acid, and hydrogenated rosin acids such as dihydroabietic acid and tetrahydroabietic acid.

It is well known that rosin is a mixture of isomeric rosin acids, the best known of which are abietic acid, sapinic acid, and d-pimaric acid. The relative proportions in which these and the other isomeric rosin acids occur in a given sample of rosin depend on the source of the rosin. Thus, wood rosin contains more abietic acid than any of the other acids, while American gum rosin contains more sapinic acid, and French gum rosin contains more d-pimaric acid. The several isomeric acids found in various types of rosin can also be separated prior to modification or the natural rosin can be refined, as by crystallization, prior to modification.

Natural rosins, refined rosins, mixtures of pure rosin acids, or a single pure rosin acid such as abietic acid can be polymerized by known methods, such, for example, as by the methods disclosed in U.S. Patents Nos. 2,108,928, 2,124,675, and 2,136,525; hydrogenated by known procedures to produce dihydrogenated rosin and tetrahydrogenated rosin; and treated by known methods such, for example, as by the method disclosed in U.S. Patent No. 2,486,183 so that selective dehydrogenation and hydrogenation occur to produce what is refered to in the art as disproportionated rosin.

Disproportionated rosin is a preferred rosin extender for rubber, and the commercially available disproportionated rosins will generally contain, by weight, about 0.5% abietic acid, from about 40% to 60% dehydroabietic acid, the remainder being mostly dihydro rosin acids and a small amount of neutral materials. Disproportionated rosin can be prepared from any suitable rosin material including gum rosin, wood rosin, and tall oil rosin, and in any suitable manner as by heat treatment in the presence of a catalyst such as iodine, sulfur dioxide, platinum, and the like catalyst. A suitable method for effecting disproportionation of rosin is disclosed in U.S. Patent No. 2,138,183.

Hydrogenated rosin which can be used as an extender for rubber is the product which is obtained by hydrogenating rosin as such, which consists chiefly of abietic, pimaric, sapinic, or like rosin acids or mixtures thereof, under conditions suitable to achieve saturation of at least about 50% of the available two double bonds of the rosin acid radicals present. The term "hydrogenated rosin" includes similarly hydrogenated products obtained from any of the group of rosin acids in substantially pure form or mixtures of the pure rosin acids. Hydrogenated rosin can be prepared, for example, by contacting fluid, refined rosin with hydrogen, in the presence of an activated nickel catalyst, under a pressure of about 4000 to 5000 pounds per square inch and at a temperature of about 210° C. to about 230° C. Suitable methods for producing hydrogenated rosin are described in U.S. Patent No. 2,094,117, reference to which is hereby made.

It is known that tall oil contains about 90% of acidic material which is comprised of essentially equal parts of fatty acids and rosin acids. Thus, tall oil provides a source of rosin acids which can be separated therefrom by known procedures and modified as above. In addition, natural tall oil or refined tall oil can be employed as an extender or it can be treated so as to modify the rosin acid components thereof as set forth above.

Another suitable rosin extender for rubber is the reaction product derived from rosin and furmaric acid. A product of this type is available commercially under the proprietary designation Amberol 820.

A complete and comprehensive discussion of rosin and its modified forms can be found in an article by George C. Harris entitled "Rosin and Rosin Derivatives," Encyclopedia of Chemical Technology, vol 11, pages 779–810, December 1953, reference to which is hereby made.

In addition to use of rosin and the various modified rosins as extenders for rubber, it has been determined that the substantially petroleum hydrocarbon-insoluble pine wood resin prepared, for example, in accordance with the processes of U.S. Patent Nos. 2,193,026 and 2,221,540, or equivalent processes which separate the petroleum hydrocarbon-insoluble pine wood resin from the rosin can be employed as an extender for rubber in accordance with this invention. This material, which is characterized herein by the term "substantially petroleum hydrocarbon-insoluble pine wood resin," is the resinous material which can be prepared from pine wood by the following procedure. Pine wood, which has or has not been steamed to remove volatile constituents such as turpentine and pine oil, can be extracted with a coal tar hydrocarbon such as benzol or toluol, or other suitable extraction solvent, and the extract then freed of volatile constituents, leaving a residue consisting of a mixture of wood rosin and the resin used in the present composition as a rubber extender. Extraction of this mixture with a petroleum hydrocarbon such as, for example, gasoline, dissolves and removes the rosin. After separation of the rosin, a resinous residue remains which is low in abietic acid. Alternatively, the material obtained on evaporation of the coal tar hydrocarbon extract can be dissolved in a mixture of furfural and a petroleum hydrocarbon such as gasoline, and the two layers which form separated, in which case the substantially petroleum hydrocarbon-insoluble resin is found dissolved in the furfural phase from which it can be obtained by evaporation of the furfural. Other known methods of isolating the desired petroleum hydrocarbon-insoluble pine wood resin can be employed, if desired.

This resin is characterized by a dark brown color, cherry red solution, and by substantial insolubility in petroleum hydrocarbons, but it will vary somewhat in its specific characteristics such as acid number, melting point, exact petroleum ether solubility, and content of naphtha- and toluol-insoluble material, depending upon the details of the extraction processes utilized. This resin will meet substantially the following specifications, namely, substantial insolubility in petroleum hydrocarbons, substantially complete solubility in alcohol, a methoxy content from about 3% to about 7.5% (usually from about 4% to about 6%), an acid number in the range from about 80 to about 110, and a drop melting point in the range from about 100° C. to about 140° C. as determined by the Hercules drop method for determining the softening point of rosins and stabilized resins. This resin is a solid material of phenolic character and comes into commerce in the pulverized or ground form, as well as in lump or aqueous emulsion form.

By chemical analysis, a typical sample of the substantially petroleum hydrocarbon-insoluble pine wood resin, prepared as hereinabove described, was found to have an average molecular weight of about 450, an acid number of about 95, and an active hydrogen content, calculated as hydroxyl and corrected for acid number, of about 5–6%. From these values, it is calculated that there are on the average about 1.5 moles of alcoholic and phenolic hydroxyl groups and about 0.8 mole of carboxylic acid group per mole of resin based on an average molecular weight of the resin of about 450.

The synthetic rubbers that can be used as the rubber component of the composition of this invention are well known in the art and include the homopolymers and copolymers derived from conjugated diene hydrocarbons such as butadiene-1,3, methyl-2-butadiene-1,3 (isoprene), chloro-2-butadiene-1,3 (chloroprene), methyl - 1 - butadiene-1,3 (piperylene), and 2,3-dimethylbutadiene-1,3. Synthetic rubbers can be derived by copolymerizing any of the above compounds with up to 70% by weight of monomers that contain a vinyl group (CH₂=CH<). Examples of such compounds that contain a vinyl group are the aryl olefins such as styrene, α-methylstyrene, p-chlorostyrene, dichlorostyrene, β-methyldichlorostyrene, and vinyl naphthalene; the α-methylene carboxylic acids, and their esters, nitriles, and amides such as acrylic acid, methylacrylate, methylmethacrylate, acrylonitrile, methacrylonitrile, and methacrylamide; methyl vinyl ether; methyl vinyl ketone; vinyl pyridine; and vinylidene chloride. The butyl rubbers can be employed in this invention also. The butyl rubbers are derived by the copolymerization of isobutene (usually about 98% by weight) and either isoprene or butadiene-1,3. Examples of commercially available synthetic rubbers are neoprene, GR-M, or CR rubber (polymerized chloro-2-butadiene-1,3). Buna S, GR-S, or SBR rubber (a copolymer of butadiene-1,3 and styrene), Buna N, GR-A, or NBR rubber (a copolymer of butadiene-1,3 and acrylonitrile), and GR-I or IIR (a copolymer of butadiene-1,3, and isobutene or a copolymer of isoprene and isobutene).

A preferred synthetic rubber for use in this invention is a synthetic polybutadiene containing at least about 75 percent butadiene joined together by cis-1,4 linkage. The cis-polybutadienes can be produced by any of the known polymerization processes which yield predominantly cis-1,4-butadiene polymers. The cis-1,4-polybutadienes which can be employed in this invention will have a viscosity between 40 and 150 and higher if desired as measured on the Mooney viscosimeter at 212° F. (ML-4). A more preferred range of Mooney viscosity is from 80 to 150. The polybutadiene is one in which at least about 75 percent and up to 100 percent, preferably 85 to 98 percent, of the polymer is formed by cis-1,4 addition of the butadiene, the remainder of the polymer being formed by trans-1,4 and 1,2 addition of the butadiene.

Another suitable synthethic rubber is a synthetic polybutadiene containing from about 30% to 35% butadiene joined together by cis-1,4 linkage and the remainder of the polymer being formed by trans-1,4 and 1,2 addition of the butadiene, the polymer being characterized by substantially regular repetition of the cis and trans configurations in the polymer chain. These polymers will have a viscosity between about 40 and 150 as measured on the Mooney viscosimeter at 212° F. (ML-4).

Known extending oils can be incorporated into the novel compositions of this invention if desired. The extending oils which can be used cover a wide range of oils having various chemical and physical properties. Any of the well-known oils that are compatible with rubber, ranging from very light to very viscous, can be used as extending oils in accordance with well-known practices. Whitby (Synthetic Rubber, page 219, John Wiley & Sons, 1954) indicates that extender oils can be divided into three broad classes, namely, naphthenic, aromatic, and highly aromatic. For non-discoloring rubbers, naphthenic oils are usually employed, while aromatic and highly aromatic oils are preferred for discoloring rubbers. Thus, suitable extended oils include pine tar, light lubricating oils, and the like. Circosol 2XH (a proprietary designation) is a light lubricating oil fully described in Rubber Age, vol. 70, No. 6, pages 735-747, March 1953, and is a particularly suitable extender oil. Circosol 2XH contains hydrocarbons of high molecular weight, in the form of a heavy, viscous, transparent, pale green, odorless liquid of low volatility; it has a specific gravity of 0.940, and a Saybolt Universal viscosity at 100° F. of about 2000 seconds. Other extender oils are disclosed and described in U.S. Patent No. 2,964,083. The amount of extender oil employed will be form about 15 to 150 parts by weight for each 100 parts by weight of rubber component.

The usual fillers, reinforcing agents, antioxidants, vulcanizers, extenders, plasticizers, softeners, processing aids, as well as activators and accelerators well known in the preparation of natural rubber and synthetic rubber compositions, can be employed in accordance with this invention.

Fillers that can be employed include aluminum flake, antimony sulfide, asbestos, barium sulfate, cadmium sulfide, appropriate grades of carbon black, chromic oxide, clay, such as bentonite, cotton linters, iron oxide, lime, litharge, lithopone, magnesium carbonate, magnesium oxide, silica, slate flour, talc, titanium oxide, whiting, zinc oxide, zinc sulfide, and the like. Zinc oxide, reinforcing grades of carbon black, hydrated silica, calcium carbonate, and the like, can be employed as reinforcing agents. Suitable pigments, such as ultramarine, vermilion, or the like, can be employed to impart to the composition a desired color.

The vulcanizing agent which is employed preferably is sulfur. However, in certain cases, selenium or tellurium can be employed either alone or in conjunction with sulfur in order to obtain certain modifications of the characteristics of the composition in respect to the vulcanization process. In the event that the traces of these vulcanizing agents might be objectionable in the vulcanized product, a peroxide vulcanizing agent such as benzoyl peroxide, dicumyl peroxide, and the like, can be employed.

As a means for obtaining vulcanization of the composition at lower tempeartures or for increasing the rate of vulcanization, suitable accelerators can be employed. Accelerators which are familiar to the art are, in general, satisfactory. Thus, suitable accelerators include 2-mercaptobenzothiazole, N-oxydiethylene benzothiazole-2-sulfenamide, di-o-tolyl guanidine, ethylidine guanidine, hexamethylenetetramine, methylene aniline, tetramethyl thiuram disulfide, thiocarbanilide, diphenylamine, diphenyl guanidine, tetramethylthiuram monosulfide, triethyltrimethylenetriamine, and the like. The effects of these various accelerators and of accelerators which are equivalent thereto, upon the vulcanization of the composition and upon its properties after vulcanization may vary somewhat, in a manner known to the art, and thereby provide means for controlling certain of the properties of the vulcanized product. Although the additional control of the characteristics may be desirable in certain circumstances, in general the use of 2-meraptobenzothiazole or of N-cyclohexyl-2-benzothiazole sulphenamide has been found to be preferable.

The following examples will illustrate this invention more fully. In the examples, all parts and percentages are by weight unless otherwise indicated.

Example 1

The following composition was milled at a temperature of about 212° F. to provide a vulcanizable, substantially homogeneous mass, and was subsequently vulcanized for 60 minutes at a temperature of 295° F. under a pressure of about 700 p.s.i.

| Component: | Parts |
|---|---|
| Cis-1,4-polybutadiene, Mooney value of 42 (ML-4 at 212° F.), cis-1,4 addition, 90-92% | 75 |
| Disproportionated wood rosin | 25 |
| Naphthenic oil, processing aid (Circosol 2XH) | 10 |
| HAF carbon black (Vulcan 6) | 50 |
| Mixture of diaryl-p-phenylenediamines, antioxidant (Wingstay 100) | 1 |
| Stearic acid (Stearex Beads) | 2 |
| Zinc oxide (Horsehead XX4) | 3 |
| N-oxydiethylene benzothiazole-2-sulfenamide plus a small percentage of benzothiazyl disulfide, accelerator (Amax No. 1) | 0.75 |
| Sulfur | 2.5 |

The vulcanizate had fair building tack. The vulcanizate was aged in an air oven maintained at a temperature of about 212° F. for a period of about 48 hours, and an examination of the aged vulcanizate indicated exudation of a substantial portion of the disproportionated rosin component.

Example 2

Example 1 was repeated with the exception that the composition contained 2.2 parts of sulfur instead of 2.5 parts, and instead of 25 parts of disproportionated wood rosin as used in Example 1, the composition of this example contained 24 parts of disproportionated wood rosin and one part of triethanolamine. Building tack of the vulcanizate was good and there was no exudation or blooming of the disproportionated wood rosin from the vulcanizate after aging.

Example 3

Example 1 was repeated with the exception that the composition used contained 2.1 parts of sulfur instead of 2.5 parts, and the composition contained, instead of 25 parts of disproportionated wood rosin, 23.75 parts of disproportionated wood rosin and 1.25 parts of triethanolamine. Building tack of the vulcanizate was good, and there was no exudation of the disproportionated wood rosin from the vulcanizate after aging.

Example 4

Example 1 was repeated except that the composition contained 2 parts sulfur instead of 2.5 parts and contained 23.5 parts of disproportionated wood rosin and 1.5 parts of triethanolamine. There was no exudation of disproportionated wood rosin after aging.

Example 5

Example 1 was repeated with the exception that the composition contained in addition to the components in Example 1 1.25 parts of triethanolamine. The composition had good processability at 212° F. and had fair building tack. There was no exudation or blooming of the disproportionated wood rosin from the vulcanizate after aging.

Table I below shows a comparison of certain physical properties of the vulcanizates of Examples 1, 2, 3, 4, and 5. It is to be noted that the physical properties of the vulcanizates containing triethanolamine are superior to those of the Example 1 vulcanizate which, while containing disproportionated wood rosin, contained no triethanolamine. Aging of the vulcanizates was done in a circulating air oven at 212° F. for 48 hours.

TABLE I

| Example No | 1 | 2 | 3 | 4 | 5 |
|---|---|---|---|---|---|
| Tensile Strength, p.s.i. (unaged) | 3,125 | 3,330 | 3,225 | 3,240 | 3,300 |
| Percent Retention of Tensile Strength After Aging | 88 | 91 | 94 | 96 | 92 |
| Elongation at Break (unaged), percent | 480 | 560 | 565 | 600 | 580 |
| Percent Retention of Elongation After Aging | 57 | 66 | 71 | 76 | 70 |

Example 6

The following composition was milled at a temperature of about 212° F. to provide a viscous, substantially homogeneous, vulcanizable mass which was subsequently vulcanized at 295° F. under a pressure of about 700 p.s.i. for 60 minutes.

| Component: | Parts |
|---|---|
| Cis-1,4-polybutadiene, Mooney value of 42 (ML–4 at 212° F.), cis-1,4 addition, 90–92% | 50 |
| Natural rubber (No. 1 smoked sheets) | 50 |
| Naphthenic oil, processing aid (Circosol 2XH) | 10 |
| Carbon black (Vulcan 6) | 50 |
| Mixture of diaryl - p - phenylenediamines, antioxidant (Wingstay 100) | 1 |
| Stearic acid (Stearex Beads) | 2 |
| Zinc oxide (Horsehead XX4) | 3 |
| N - oxydiethylene benzothiazole-2-sulfenamide plus a small percentage of benzothiazyl disulfide, accelerator (Amax No. 1) | 0.75 |
| Sulfur | 1.4 |

Example 7

Example 6 was repeated except that 1.5 parts of sulfur was employed instead of 1.4 parts, and 100 parts of the cis-1,4-polybutadiene was employed as the rubber component of the composition in place of the 50 parts of cis-1,4-polybutadiene and 50 parts of natural rubber as employed in Example 6.

Example 8

Example 6 was repeated except that 2.4 parts of sulfur was used in the composition, 66.6 parts of the cis-1,4-polybutadiene was used as the rubber component in place of the natural rubber-polybutadiene rubber component of Example 6, and there was incorporated separately into the composition 33.3 parts of disproportionated wood rosin and 3 parts of triethanolamine (about 8.35% of triethanolamine, based on the disproportionated wood rosin).

Example 9

Example 8 was repeated with the exception that the disproportionated wood rosin (33.3 parts) and the triethanolamine (3 parts) were thoroughly admixed to provide a substantially homogeneous blend prior to incorporation into the composition.

Example 10

Example 7 was repeated except that the composition contained 66.7 parts of the cis-1,4-polybutadiene instead of 100 parts and contained, in addition to the other components of Example 6, 33.3 parts of disproportionated wood rosin. The disproportionated wood rosin exuded from the vulcanizate after aging.

Table II below gives certain physical properties of the vulcanizates of the above Examples 6, 7, 8, 9, and 10. Unless otherwise indicated, "oven aged" refers to heating the vulcanizates in a circulating air oven maintained at a temperature between about 212° F. to 220° F. for a period of about 48 hours.

TABLE II

| Example No | 6 | 7 | 8 | 9 | 10 |
|---|---|---|---|---|---|
| Mill Processing at 212° F | (1) | (2) | (1) | (1) | (1) |
| Dry Building Tack | (1) | (3) | (4) | (4) | (4) |
| Exudation of Rosin Component After Being Oven Aged | | | No | No | Yes |
| Mooney Viscosity ML–4 212° F | 60 | 85 | 32 | 38 | 40 |
| Specific Gravity (Vulcanized) | 1.104 | 1.106 | 1.158 | 1.153 | 1.155 |
| Modulus at 300% Elong., p.s.i | 1,040 | 825 | 1,110 | 1,160 | 1,240 |
| Oven Aged | 1,670 | 1,890 | 2,320 | 2,155 | 2,550 |
| Percent Retention After Aging | 160 | 230 | 208 | 185 | 205 |
| Tensile Strength, p.s.i., 25° C | 3,290 | 3,290 | 3,190 | 3,030 | 3,200 |
| Oven Aged | 2,430 | 3,140 | 3,300 | 2,860 | 2,550 |
| Percent Retention After Aging | 74 | 95 | 103 | 94 | 79 |
| Elongation at Break, Percent, 25° C | 620 | 690 | 620 | 610 | 640 |
| Oven Aged | 380 | 400 | 405 | 395 | 300 |
| Percent Retention After Aging | 61 | 58 | 65 | 65 | 47 |
| Shore "A" Hardness, 25° C | 55 | 53 | 55 | 60 | 61 |
| Oven Aged | 63 | 67 | 64 | 68 | 66 |

TABLE II—Continued

| Example No | 6 | 7 | 8 | 9 | 10 |
|---|---|---|---|---|---|
| Percent Retention After Aging | 114 | 126 | 116 | 113 | 108 |
| Yerzley Resilience, Percent, 25° C | 62 | 65 | 53 | 46 | 42 |
| Graves Tear Strength, lbs./in., 25° C | 230 | 184 | 210 | 228 | 230 |
| Goodrich Flexometer Test (Ambient 214° F. under 170 p.s.i. load): | | | | | |
| Heat Build-up ΔT° F | 17 | 17 | 13 | 14 | 15 |
| Hysteresis Set, Percent | 7.5 | 7.3 | 3.9 | 3.7 | 3.8 |
| Drift, Percent | 4.9 | 4.0 | 1.4 | 2.0 | 1.8 |
| Goodrich Flexometer Test (Ambient 80° F.-87° F. under 170 p.s.i. load): | | | | | |
| Heat Build-up ΔT° F | 44 | 47 | 40 | 42 | 44 |
| Hysteresis Set, Percent | 4.1 | 3.9 | 2.2 | 2.5 | 2.4 |
| Drift, Percent | ~2.8 | 1.1 | 0 | 1.1 | 0.5 |
| Demattia [5] Aged Hot Flex Cut Growth, Inches Growth Per 100 Kiloflexes (212–220° F.) | 5.1 | 20.3 | 8.8 | 7 | 20 |
| Low Temp. Flexibility (Modulus of Rigidity p.s.i.): | | | | | |
| −80° C. (−112° F.) | 9,850 | | 10,650 | 10,985 | |
| −110° C. (−166° F.) | | 6,950 | | | |
| Ozone Resistance [6] at 95–100° F., Minutes Required to Produce First Cracks | ~10 | ~5 | ~20 | ~20 | ~10 |

[1] Good.
[2] Poor.
[3] Fair.
[4] Excellent.
[5] Samples were air oven aged 54 hrs. at 212° F.
[6] Looped samples (Static) Ozone concentration 100+ parts per 100 million. Observations for cracking were made under 5X magnification.

It will be noted from Table II above that the disproportionated rosin-triethanolamine modified rubber compositions of Examples 8 and 9 show all-around equivalence with the unmodified composition of Examples 6 and 7 with distinct superiority in certain properties. Especially for passenger tire tread application, the low Yerzley resilience and good heat build-up resistance of the vulcanizates of Examples 8 and 9 is a desirable combination of properties which give good ride (rumble absorption) and a low squeal, without incurring excessive heat build-up.

The wear-resistant properties of tire treads prepared from the compositions of Examples 6 and 8 were determined by actual road tests using miniature tires on tow-jigs as described in Proceedings, International Rubber Conference, Washington, D.C., November 1959, page 95. Tire treads prepared from the Example 8 composition (average for four test tires) gave 57% more mileage than those prepared from the Example 6 composition (average for four test tires).

The following examples, set forth in tabulated form in Table III below show the utility of various types of extenders, including rosin extenders, that are applicable for use in carrying out this invention. The composition employed in the examples consisted of the following components in the amounts set forth.

| Component: | Parts |
|---|---|
| Cis-1,4-polybutadiene, Mooney value of 42 (ML–4 at 212° F.), cis-1,4 addition, 90–92% | 66.7 |
| Extender or extender plus treithanolamine | 33.3 |
| Naphthenic oil, processing aid (Circosol 2XH) | 10.0 |
| Carbon black (Vulcan 6) | 50.0 |
| Mixture of diaryl-p-phenylenediamines, antioxidant (Wingstay 100) | 1.0 |
| Stearic acid (Stearex Beads) | 2.0 |
| Zinc oxide | 3.0 |
| N-oxydiethylene benzothiazole-2-sulfenamide plus a small percenatge of benzothiazyl disulfide, accelerator (Amax No. 1) | 0.75 |
| Sulfur | 2.4 |

The specific extender or extender plus triethanolamine (anti-blooming agent) employed in each example is set forth in the table. In the table B.B.A. stands for "blended before adding," which means that the extender and the triethanolamine were blended prior to incorporation into the composition, and I.S. stands for "incorporated separately," which means that the extender and the triethanolamine component were incorporated into the composition separately. Vulcanizates were prepared from each composition by first milling the composition at a temperature of about 212° F. to provide a workable, viscous, substantially homogeneous mass and subsequently heating the mass at a temperature of about 295° F., under a pressure of about 700 p.s.i. for about 60 minutes. Aging of the vulcanizates was accomplished in a circulating air oven maintained at a temperature of about 212° F. for a period of 24 hours.

TABLE III

| Example No. | Extender | Parts of Extender | Parts of Triethanolamine | Mill Processing | Building Tack | Tensile Strength (p.s.i.) | Exudation After Oven Aging |
|---|---|---|---|---|---|---|---|
| 11 | Hydrogenated Wood Rosin | 30.84 | 2.46 (B.B.A.) | Good | Fair | 3,090 | No. |
| 12 | do | 33.3 | None | do | do | 3,260 | Yes. |
| 13 | Wood Rosin Dimer | 30.84 | 2.46 (B.B.A.) | do | do | 2,505 | No. |
| 14 | do | 33.3 | None | do | do | 2,130 | Yes. |
| 15 | Polymerized Wood Rosin | 30.84 | 2.46 (B.B.A.) | do | do | 2,805 | No. |
| 16 | do | 33.3 | None | do | do | 3,260 | Yes. |
| 17 | Pine Wood Resin Substantially Insoluble in Petroleum Hydrocarbons. | 30.8 | 2.5 (I.S.) | Fair | None | 1,865 | No. |
| 18 | Rosin—Fumaric Acid Adduct | 30.8 | 2.5 (I.S.) | Good | Fair | 2,135 | No. |
| 19 | Wood Rosin | 30.8 | 2.5 (B.B.A.) | do | do | 2,575 | No. |
| 20 | Disproportionated Tall Oil | 30.8 | 2.5 (I.S.) | Fair | Poor | 2,360 | No. |
| 21 | Disproportionated Blend (≅2:1) of Fatty Acids and Rosin Acids. | 30.8 | 2.5 (I.S.) | do | do | 2,420 | No. |

The examples summarized in Table IV below illustrate the use of various amines as anti-blooming agents to prevent exudation of a rosin extender from a rosin-extended rubber composition. The composition employed in these examples consisted of the following components in the amounts specified.

| Component: | Parts |
|---|---|
| Cis-1,4-polybutadiene, Mooney value of 42 (ML–4 at 212° F.), cis-1,4 addition, 90–92%, rubber component | See Table IV. |
| Disproportionated wood rosin plus anti-blooming agent | See Table IV. |
| Naphthenic oil, processing aid (Circosol 2XH) | 10. |
| HAF carbon black | 50. |
| Mixture of diaryl - p - phenylenediamines, antioxidant (Wingstay 100) | 1. |
| Stearic acid (Stearex Beads) | 2. |
| Zinc oxide | 3. |
| N - oxydiethylene benzothiazole-2-sulfenamide plus a small percentage of benzothiazyl disulfide, accelerator (Amax No. 1) | 0.75. |
| Sulfur | 2.4. |

Vulcanizates were prepared from each composition by heating and milling the composition to provide a viscous, workable, substantially homogeneous rubber mass and subsequently vulcanizing the mass under a pressure of about 700 p.s.i. at a temperature of about 212° F. for a period of about 60 minutes. Aging of the vulcanizates was accomplished in a circulating air oven maintained at a temperature of about 212° F. for 24 hours. I.S. and B.B.A. have the same meaning as in Table III.

TABLE IV

| Example No. | Anti-Blooming Agent | Anti-Blooming Agent Parts | Disproportionated Wood Rosin Parts | Rubber Component Parts | Processing Properties | Building Tack | Exudation After Cure | Tensile Strength (p.s.i.) |
|---|---|---|---|---|---|---|---|---|
| 22 | n-Octylamine | 1.875 | 23.125 (I.S.) | 75 | Good | Good | None | 3,500 |
| 23 | Rosin Amine | 2.50 | 22.50 (B.B.A.) | 75 | Poor | do | do | 2,900 |
| 24 | Diethanolamine | 2.475 | 30.525 (B.B.A.) | 67 | Good | do | do | 3,135 |
| 25 | 1,3-diphenylguanidine | 1.875 | 23.125 (I.S.) | 75 | Poor | None | do | 2,570 |
| 26 | Morpholine | 1.89 | 23.11 (B.B.A.) | 75 | do | do | do | 2,955 |

Example 27

The following composition was prepared.

| Component: | Parts |
|---|---|
| Cis-1,4-polybutadiene, Mooney viscosity of 42 (ML–4 at 212° F.), cis-1,4 addition, 90–92%, rubber component | 67 |
| Disproportionated wood rosin plus 5% triethanolamine | 33 |
| HAF carbon black | 50 |
| Naphthenic oil, processing aid (Circosol 2XH) | 10 |
| Mixture of diaryl-p-phenylenediamines, antioxidant (Wingstay 100) | 1 |
| Stearic acid (Stearex Beads) | 2 |
| Zinc oxide | 3 |
| N-oxydiethylene benzothiazole - 2 - sulfenamide plus a small percentage of benzothiazyl disulfide, accelerator (NOBS special) | 0.75 |
| Sulfur | 2.1 |

The processing properties of this composition were good, the Mooney viscosity ML–4 at 212° F. was 40, and the Mooney Scorch at 270° F. min./5-pt. rise was 19.

Example 28

Example 27 was repeated with the exception that the cis-1,4-polybutadiene was replaced with a higher viscosity cis-1,4-polybutadiene having a Mooney viscosity ML–4, 212° F., of about 110 and a cis-1,4 content of 90–92%. The processing properties of this composition were excellent, the Mooney viscosity ML–4 at 212° F. was 50, and the Mooney Scorch at 270° F. min./5-pt. rise was 14.

Example 29

Example 27 was repeated with the exception that 100 parts of an oil-extended, high-viscosity cis-1,4-polybutadiene having a Mooney viscosity ML–4, 212° F., of 40 was used as the rubber component, and no rosin extender was used to extend the rubber component nor was there any triethanolamine present in the composition. The oil-extended cis-1,4-polybutadiene employed consists of, by weight, 33⅓% naphthenic process oil and 66⅔% of cis-1,4-polybutadiene having a Mooney viscosity ML–4, 212° F., of about 100 and a cis-1,4 addition of about 96–97%. This oil-extended polybutadiene is available commercially under the proprietary designation Ameripol 442. Processing properties of this composition were poor, the Money viscosity ML–4 212° F. was 43, and Mooney Scorch at 270° F. min./5-pt. rise was 34.

In Table V below there are set forth certain properties of the compositions of Examples 27, 28, and 29. Aging was done in a circulating air oven at a temperature of about 212° F. for about 48 hours.

TABLE V

| | Vulcanizing Time at 298° F. (Minutes) | Example 27 | | Example 28 | | Example 29 | |
|---|---|---|---|---|---|---|---|
| | | Unaged | Aged | Unaged | Aged | Unaged | Aged |
| Modulus at 100%, p.s.i. | 20 | 255 | | 240 | | 210 | |
| | 30 | 265 | | 245 | | 225 | |
| | 45 | 240 | 410 | 255 | 340 | 230 | 423 |
| | 60 | 295 | | 225 | | 225 | |
| | 120 | 215 | | 230 | | 200 | |
| Modulus at 300%, p.s.i. | 20 | 1,040 | | 1,240 | | 880 | |
| | 30 | 985 | | 1,330 | | 1,085 | |
| | 45 | 1,020 | 1,742 | 1,150 | 1,650 | 1,095 | 1,073 |
| | 60 | 1,050 | | 1,160 | | 1,175 | |
| | 120 | 840 | | 1,050 | | 840 | |
| Tensile Strength, p.s.i. | 20 | 3,090 | | 2,885 | | 1,850 | |
| | 30 | 2,885 | | 3,200 | | 1,450 | |
| | 45 | 3,180 | 2,845 | 3,045 | 2,815 | 1,680 | 1,270 |
| | 60 | 3,345 | | 3,180 | | 1,330 | |
| | 120 | 3,140 | | 3,325 | | 1,510 | |
| Elongation, percent | 20 | 670 | | 575 | | 500 | |
| | 30 | 665 | | 550 | | 385 | |
| | 45 | 675 | 435 | 605 | 430 | 410 | 217 |
| | 60 | 715 | | 640 | | 320 | |
| | 120 | 750 | | 660 | | 425 | |
| Shore A2 Hardness | 20 | 54 | | 56 | | 47 | |
| | 30 | 54 | | 55 | | 49 | |
| | 45 | 53 | 61 | 54 | 62 | 50 | 64 |
| | 60 | 55 | | 54 | | 50 | |
| | 120 | 55 | | 53 | | 48 | |
| Break Set, Percent | 20 | 20 | | 20 | | 15 | |
| | 30 | 20 | | 20 | | 10 | |
| | 45 | 30 | 15 | 20 | 10 | 10 | 0 |
| | 60 | 35 | | 20 | | 10 | |
| | 120 | 20 | | 20 | | 10 | |
| Relative Wear Resistance, percent | | 124 | | 132 | | 100 | |

Example 28 utilizes a higher viscosity cis-1,4-polybutadiene which is used in oil-extended polybutadiene. As the test data in Table V show, the higher viscosity polybutadiene provides a rosin-extended product with better processing characteristics than either regular viscosity polybutadiene with rosin extender (Example 27) or high viscosity polybutadiene with oil extender (Example 29). The low tensile strength of the commercial oil-extended product should be noted especially as well as the 32% better wear resistance of the rosin-extended high viscosity cis-1,4-polybutadiene compared with the oil-extended cis-1,4-polybutadiene.

Physical properties of the vulcanizates, at specific vulcanization times, are set forth in Table VI below.

TABLE VI

|  | Minutes Vulcanized | Example No. | | | |
| --- | --- | --- | --- | --- | --- |
|  |  | 30 | 31 | 32 | 33 |
| Modulus at 300%, p.s.i | 7.5 | 475 | 1,500 |  |  |
|  | 15 | 1,165 | 1,735 | 455 | 1,250 |
|  | 30 | 1,750 | 1,930 | 725 | 1,350 |
|  | 60 |  |  | 1,115 | 1,160 |
| Tensile Strength, p.s.i | 7.5 | 2,200 | 4,385 |  |  |
|  | 15 | 3,985 | 4,300 | 2,230 | 4,070 |
|  | 30 | 3,785 | 4,100 | 3,315 | 4,110 |
|  | 60 |  |  | 3,425 | 3,560 |
| Elongation at Break, percent | 7.5 | 675 | 690 |  |  |
|  | 15 | 640 | 595 | 700 | 675 |
|  | 30 | 535 | 515 | 660 | 640 |
|  | 60 |  |  | 615 | 600 |
| Shore "A" Hardness | 7.5 | 39 | 56 |  |  |
|  | 15 | 50 | 63 | 36 | 51 |
|  | 30 | 56 | 63 | 44 | 49 |
|  | 60 |  |  | 46 | 49 |
| Exudation on Aging 24 hrs. at 212° F | 7.5 | Yes | No |  |  |
|  | 15 | Yes | No | Yes | No |
|  | 30 | Yes | No | Yes | No |
|  | 60 |  |  | Yes | Slight |

Example 30

A composition consisting of the following components was prepared and milled at 212° F. to provide a workable, viscous, homogeneous, vulcanizable rubber composition.

| Component: | Parts |
| --- | --- |
| Natural rubber (No. 1 ribbed smoked sheets) | 100 |
| Stearic acid | 2 |
| Zinc oxide | 5 |
| Mixture of octylated diphenylamine, antioxidant (Age-Rite Stalite) | 1 |
| Sulfur | 2.75 |
| Benzothiazyl disulfide, accelerator (Altax) | 1.0 |
| Tetramethylthiuram disulfide, accelerator (Methyl Tuads) | 0.1 |
| HAF carbon black (Philblack O) | 50 |
| Rosin component (disproportionated wood rosin) | 20 |

Example 31

A vulcanizable rubber composition was prepared using the components of Example 30 with the exception that the rosin component used was a blend of 19 parts of disproportionated wood rosin and 1 part of triethanolamine.

Example 32

A vulcanizable rubber composition was prepared using the components of Example 30 except that 40 parts of disporportionated wood rosin was employed instead of the 20 parts of Example 30.

Example 33

A vulcanizable rubber composition was prepared using the components of Example 30 except that the rosin component used was a blend of 38 parts of disproportionated wood rosin and 2 parts of triethanolamine.

The vulcanizable natural rubber compositions of Examples 30, 31, 32, and 33 were vulcanized at 293° F. under a pressure of 700 p.s.i. for various periods of time.

Example 34

A butadiene-styrene rubber composition was prepared from the following components.

| Components: | Parts |
| --- | --- |
| GR–S X–732 | 86 |
| Disproportionated wood rosin | 14 |
| HAF carbon black | 50 |
| Zinc oxide | 5 |
| Stearic acid | 2 |
| N-cyclohexyl-2-benzothiazole sulfenamide, accelerator (Santocure) | 1 |
| Sulfur | 1.75 |

GR–S X–732 is a rosin-extended butadiene-styrene copolymer comprised of 73% of a high-viscosity butadiene-styrene copolymer and 27% of disproportionated wood rosin. The processability of this composition on mill rolls at room temperature was good. The tensile strength of the vulcanizate (press cured under 700 p.s.i. for 60 minutes at 300° F.) was 3,035 p.s.i. The vulcanizate was heated in an air oven for 24 hours at 212° F., and resin exudation was observed.

Example 35

Example 34 was repeated except that 3.6 parts of triethanolamine was incorporated into the composition. The processability of the composition on mill rolls at room temperature was good, and the tensile strength of the vulcanizate was 3,760 p.s.i. There was no evidence of resin exudation after heating the vulcanizate in an air oven for 24 hours at 212° F.

Example 36

A vulcanizable rubber composition comprised of the following components was prepared.

| Components: | Parts |
| --- | --- |
| Cis-1,4-polybutadiene having a Mooney viscosity ML-4 212° F. of 110 and cis-1,4 addition content of 90–92% | 67 |
| Blend consisting of, by weight, 95% disproportionated wood rosin and 5% triethanolamine | 24.7 |
| Naphthenic oil (Circosol NS) | 8.3 |
| Naphthenic oil (Circosol 2XH) | 10.0 |
| Carbon black (Philblack O) | 50.0 |
| Zinc oxide (XX-4) | 3.0 |
| Stearic acid (Stearex Beads) | 2.0 |
| Mixture of diaryl-p-phenylenediamines, antioxidant (Wingstay 100) | 1.0 |
| N-oxydiethylene benzothiazole-2 - sulfenamide, accelerator (NOBS special) | .75 |
| Sulfur | 2.1 |

Circosol NS is a light-colored, nonvolatile naphthenic oil having a specific gravity at 60° F. of 0.9279, a Saybolt Universal seconds (SUS) viscosity at 100° F. of 781, an SUS viscosity at 210° F. of 61, a flash point of 395° F., a fire point of 445° F., a pour point of −5° F., an aniline point of 179° F., a refractive index of 1.5085, and a viscosity gravity constant of 0.870. It contains 18% aromatic carbon atoms, 39% naphthenic carbon atoms, and 43% paraffinic carbon atoms.

Example 37

Example 36 was repeated with the exception that 22 parts of the disproportionated wood rosin-triethanolamine blend was used and 11 parts of Circosol NS was used.

Example 38

Example 36 was repeated with the exception that 16.5 parts of the disproportionated wood rosin-triethanolamine blend was used and 16.5 parts of Circosol NS was used.

In Table VII below there are set forth properties of vulcanizates prepared from the compositions of Examples 36, 37, and 38.

| Component: | Part by weight |
|---|---|
| Cis-1,4-polybutadiene, Mooney value of 42 (ML−4 at 212° F.), cis-1,4-addition, 90–92% | 67 |
| Disproportionated wood rosin plus 5% hexamethylenetetramine (melt blended) | 33 |
| Carbon black (Vulcan 6) | 50 |
| Naphthenic oil, processing aid (Circosol 2XH) | 10 |
| Mixture of diaryl-p-phenylenediamines, antioxidant (Wingstay 100) | 1 |
| Stearic acid (Stearex Beads) | 2 |
| Zinc oxide (Horsehead XX4) | 3 |
| N-oxydiethylene benzothiazole-2-sulfenamide plus a small percentage of benzothiazyl disulfide, accelerator (Amax No. 1) | 0.75 |
| Sulfur (Tube brand) | 2.4 |

Vulcanizates were prepared from the above composition by vulcanizing for 60 minutes at a temperature of 298° F. under a pressure of about 700 p.s.i. Aging of the vulcanizates at 212° F. for 30 hours and for 16 hours at 300° F. showed no exudation of the disproportionated wood rosin.

The compositions of this invention can be used in the

TABLE VII

| | Minutes Cured [1] | Example 36 | | Example 37 | | Example 38 | |
|---|---|---|---|---|---|---|---|
| | | Mooney Viscosity ML−4 212° F. | | | | | |
| | | 39 | | 39 | | 39 | |
| | | Scorch at 270° F., Min. to 5 pt. rise | | | | | |
| | | 18 | | 19 | | 18 | |
| | | Unaged | Aged [2] | Unaged | Aged [2] | Unaged | Aged [2] |
| 100% Modulus, p.s.i. | 20 | 325 | 720 | 400 | 490 | 350 | 610 |
| | 30 | 375 | 715 | 400 | 650 | 340 | 675 |
| | 45 | 380 | 625 | 330 | 600 | 320 | 655 |
| | 60 | 325 | 595 | 310 | 535 | 350 | 555 |
| | 120 | 300 | 400 | 270 | 480 | 320 | 605 |
| 300% Modulus, p.s.i. | 20 | 1,690 | | 1,930 | | 1,840 | |
| | 30 | 1,920 | | 1,875 | | 1,890 | |
| | 45 | 1,680 | | 1,795 | | 1,745 | |
| | 60 | 1,670 | | 1,695 | | 1,720 | |
| | 120 | 1,620 | | 1,705 | | 1,680 | |
| Tensile Strength, p.s.i. | 20 | 2,260 | 2,130 | 2,580 | 1,360 | 2,135 | 1,750 |
| | 30 | 2,400 | 2,190 | 2,125 | 1,950 | 1,840 | 1,610 |
| | 45 | 2,720 | 2,380 | 2,150 | 2,015 | 2,019 | 1,860 |
| | 60 | 2,425 | 2,260 | 2,210 | 1,950 | 1,800 | 1,805 |
| | 120 | 2,415 | 2,110 | 2,185 | 1,980 | 2,030 | 2,055 |
| Elongation, percent | 20 | 380 | 205 | 350 | 150 | 335 | 195 |
| | 30 | 375 | 225 | 330 | 200 | 305 | 175 |
| | 45 | 440 | 280 | 340 | 215 | 325 | 205 |
| | 60 | 400 | 270 | 360 | 235 | 360 | 230 |
| | 120 | 410 | 290 | 375 | 260 | 333 | 245 |
| Shore A2 Hardness | 20 | 61 | 69 | 61 | 71 | 60 | 70 |
| | 30 | 61 | 68 | 63 | 68 | 61 | 70 |
| | 45 | 61 | 68 | 61 | 69 | 60 | 68 |
| | 60 | 59 | 68 | 61 | 69 | 59 | 67 |
| | 120 | 58 | 65 | 57 | 64 | 57 | 65 |
| Break Set, percent | 20 | 10 | 10 | 10 | 10 | 5 | 10 |
| | 30 | 5 | 10 | 5 | 10 | 5 | 10 |
| | 45 | 10 | 10 | 7 | 10 | 5 | 10 |
| | 60 | 7 | 10 | 5 | 10 | 5 | 10 |
| | 120 | 10 | 10 | 5 | 10 | 5 | 10 |
| Heat Build-Up,[3] ΔT° F. (212° F.) | | 8 | | 8 | | 8 | |
| Relative Wear Resistance | | 120 | | 118 | | 100 | |

[1] Press-cured at 298° F. under a pressure of 700 p.s.i.
[2] Air Oven Aged 48 Hours at 212° F.
[3] Cylinders cured 65 minutes/298°.

The following example illustrates the use of hexamethylenetetramine as an anti-blooming agent in accordance with this invention. When hexamethylenetetramine is employed as an anti-blooming agent, it is recommended that it be first blended with the extender and then incorporated into the rubber. This is easily and readily accomplished by first melting the extender such as disproportionated rosin and admixing therewith the desired amount of hexamethylenetetramine.

EXAMPLE 39

The following composition was milled at a temperature of about 212° F. to provide a vulcanizable, substantially homogeneous mass.

manufacture of tire treads having excellent wear-resistant properties. They can be used also in the manufacture of rubber belts, rubber floor mats, rubber impact pads, and the like, where high resistance to wear is required.

It is to be understood that the above description and examples are illustrative of this invention and not in limitation thereof.

What I claim and desire to protect by Letters Patent is:
1. A vulcanizable composition comprising
    (A) a rubber component selected from the group consisting of
        (1) natural rubber,
        (2) a polybutadiene-styrene copolymer,
        (3) a polybutadiene formed by cis-1,4-, trans-1,4-, and 1,2-addition of 1,3-butadiene, at least about

75% of the polybutadiene being formed by cis-1,4-addition of 1,3-butadiene and
(4) mixtures thereof,
(B) an extender for the rubber component selected from the group consisting of a rosin extender, a substantially petroleum hydrocarbon-insoluble pine wood resin, and mixtures thereof in an amount of from about 20 parts to 100 parts by weight for each 100 parts by weight of rubber component, and
(C) a material selected from the group consisting of diethanolamine, triethanolamine, n-octylamine, morpholine, hexamethylenetetramine, diphenylguanidine, a rosin amine, and mixtures thereof in an amount of from about 2% to 25% by weight based on the weight of extender.

2. A vulcanizable composition in accordance with claim 1 wherein rubber component (A) is a butadiene-styrene copolymer.

3. A vulcanizable composition in accordance with claim 1 wherein rubber component (A) is a polybutadiene formed by cis-1,4-, trans-1,4-, and 1,2-addition of 1,3-butadiene, at least about 75% of the polybutadiene being formed by cis-1,4-addition of 1,3-butadiene.

4. A vulcanizable composition in accordance with claim 1 wherein rubber component (A) is natural rubber.

5. A vulcanizable composition comprising
(A) a rubber component selected from the group consisting of
(1) natural rubber,
(2) a butadiene-styrene copolymer,
(3) a polybutadiene formed by cis-1,4-, trans-1,4-, and 1,2-addition of 1,3-butadiene, at least about 75% of the polybutadiene being formed by cis-1,4-addition, of 1,3-butadiene and
(4) mixtures thereof,
(B) disproportionated rosin in an amount of from about 20 parts to 100 parts by weight for each 100 parts by weight of rubber component, and
(C) triethanolamine in an amount of from about 2% to 15% by weight based on the weight of disproportionated rosin.

6. A vulcanizable composition in accordance with claim 5 wherein rubber component (A) is a polybutadiene formed by cis-1,4-, trans-1,4-, and 1,2-addition of 1,3-butadiene, at least about 75% of the polybutadiene being formed by cis-1,4-addition of 1,3-butadiene.

7. A vulcanizable composition comprising
(A) a rubber component selected from the group consisting of
(1) natural rubber,
(2) a butadiene-styrene copolymer,
(3) a polybutadiene formed by cis-1,4-, trans-1,4-, and 1,2-addition of 1,3-butadiene, at least about 75% of the polybutadiene being formed by cis-1,4-addition of 1,3-butadiene and
(4) mixtures thereof,
(B) hydrogenated rosin in an amount of from about 20 parts to 100 parts by weight for each 100 parts by weight of rubber component, and
(C) triethanolamine in an amount of from about 2% to 15% by weight based on the weight of hydrogenated rosin.

8. A vulcanizable composition in accordance with claim 7 wherein rubber component (A) is a polybutadiene formed by cis-1,4-, trans-1,4-, and 1,2-addition of 1,3-butadiene, at least about 75% of the polybutadiene being formed by cis-1,4-addition of 1,3-butadiene.

9. A vulcanizable composition comprising
(A) a rubber component selected from the group consisting of
(1) natural rubber,
(2) a butadiene-styrene copolymer,
(3) a polybutadiene formed by cis-1,4-, trans-1,4-, and 1,2-addition of 1,3-butadiene, at least about 75% of the polybutadiene being formed by cis-1,4-addition of 1,3-butadiene and
(4) mixtures thereof,
(B) polymerized rosin in an amount of from about 20 parts to 100 parts by weight for each 100 parts by weight of rubber component, and
(C) triethanolamine in an amount of from about 2% to 15% by weight based on the weight of polymerized rosin.

10. A vulcanizable composition in accordance with claim 9 wherein rubber component (A) is a polybutadiene formed by cis-1,4-, trans-1,4-, and 1,2-addition of 1,3-butadiene, at least about 75% of the polybutadiene being formed by cis-1,4-addition of 1,3-butadiene.

11. A vulcanizable composition comprising
(A) a rubber component selected from the group consisting of
(1) natural rubber,
(2) a butadiene-styrene copolymer,
(3) a polybutadiene formed by cis-1,4-, trans-1,4-, and 1,2-addition of 1,3-butadiene, at least about 75% of the polybutadiene being formed by cis-1,4-addition of 1,3-butadiene and
(4) mixtures thereof,
(B) a substantially petroleum hydrocarbon-insoluble pine wood resin in an amount of from about 20 parts to 100 parts by weight for each 100 parts by weight of rubber component, and
(C) triethanolamine in an amount of from about 2% to 15% by weight based on the weight of the substantially petroleum hydrocarbon-insoluble pine wood resin.

12. A vulcanizable composition in accordance with claim 11 wherein rubber component (A) is a polybutadiene formed by cis-1,4-, trans-1,4-, and 1,2-addition of 1,3-butadiene, at least about 75% of the polybutadiene being formed by cis-1,4-addition of 1,3-butadiene.

References Cited
UNITED STATES PATENTS

| | | | |
|---|---|---|---|
| 2,491,913 | 12/1949 | Amberg | 260—27 |
| 2,784,165 | 3/1957 | Howland | 260—27 |
| 2,829,121 | 4/1958 | Leeper | 260—45.9 |
| 2,881,096 | 4/1959 | Kisbany | 260—27 |
| 2,894,924 | 7/1959 | Rockoff | 260—27 |
| 3,060,989 | 10/1962 | Railsback et al. | 152—330 |
| 3,157,609 | 11/1964 | McNay et al. | 260—27 |

OTHER REFERENCES

1. Compounding Ingredients for Rubber, compiled by Editors of Rubber World, 3rd edition, 1961, pp. 11, 37, 38, 40, 67, 75, 87 and 341, copy available in Scientific Library (TS 1890.I53).

2. Amberg, Rubber Age, Hydrogenated Rosin in Cold Rubber Tire Tread Stocks, vol. 69, May 1951, pp. 191–199, copy available in Scientific Library (TS 1870.R6).

3. Rosin Amine D, Bulletin of Hercules Powder Co., Bulletin No. 5044, November 1952, pp. 3, 25, and 26, copy available in Group 141.

DONALD E. CZAJA, *Primary Examiner.*

F. McKELVEY, *Assistant Examiner.*